US012669585B2

(12) United States Patent
Kweon et al.

(10) Patent No.: US 12,669,585 B2
(45) Date of Patent: Jun. 30, 2026

(54) HEATING COVER FOR A LiDAR SENSOR AND A MANUFACTURING METHOD THEREOF

(71) Applicants: HYUNDAI MOTOR COMPANY, Seoul (KR); KIA CORPORATION, Seoul (KR)

(72) Inventors: Kyoung-Chun Kweon, Seoul (KR); Seon-Yong An, Chuncheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 988 days.

(21) Appl. No.: 17/889,940

(22) Filed: Aug. 17, 2022

(65) Prior Publication Data
US 2023/0176194 A1      Jun. 8, 2023

(30) Foreign Application Priority Data
Dec. 2, 2021      (KR) ........................ 10-2021-0171057

(51) Int. Cl.
| *G01S 7/481* | (2006.01) |
| *G01S 17/931* | (2020.01) |
| *H05B 3/00* | (2006.01) |
| *H05B 3/03* | (2006.01) |

(52) U.S. Cl.
CPC .......... *G01S 7/4813* (2013.01); *H05B 3/0019* (2013.01); *H05B 3/03* (2013.01); *G01S 17/931* (2020.01)

(58) Field of Classification Search
None
See application file for complete search history.

(56) References Cited

U.S. PATENT DOCUMENTS

| 10,698,085 | B2 | 6/2020 | Okumura et al. | |
| 2019/0293763 | A1 | 9/2019 | Okumura et al. | |
| 2019/0385025 | A1 | 12/2019 | Mcmichael et al. | |
| 2020/0348397 | A1 * | 11/2020 | Yamamoto | G01S 7/497 |
| 2021/0148761 | A1 | 5/2021 | Okumura et al. | |
| 2021/0333406 | A1 | 10/2021 | Lee et al. | |

(Continued)

FOREIGN PATENT DOCUMENTS

| JP | 2019016491 | A | * | 1/2019 |
| JP | 2021012028 | A | | 2/2021 |
| JP | 2021081539 | A | | 5/2021 |

(Continued)

OTHER PUBLICATIONS

WO 2021032599 A1 (Dietrich Sascha) Feb. 25, 2021 [retrieved on Sep. 23, 2025]. Retrieved from Foreign Image and Text database, translation by Clarivate Analytics (Year: 2021).*

(Continued)

*Primary Examiner* — Edward F Landrum
*Assistant Examiner* — Theodore J Evangelista
(74) *Attorney, Agent, or Firm* — Lempia Summerfield Katz LLC

(57) ABSTRACT

A heating cover for a LiDAR sensor includes a plastic cover layer and a heating film attached to a back surface of the plastic cover layer. In the heating film, an indium tin oxide (ITO) thin film layer is formed on a polyethylene terephthalate (PET) film. Respective line electrodes are arranged along both long sides on the ITO thin film layer.

13 Claims, 10 Drawing Sheets

(56) References Cited

U.S. PATENT DOCUMENTS

| | | | |
|---|---|---|---|
| 2022/0120865 A1 | 4/2022 | Yamamoto | |
| 2024/0061151 A1 * | 2/2024 | Lu | G02B 1/14 |

FOREIGN PATENT DOCUMENTS

| | | | | |
|---|---|---|---|---|
| JP | 6911803 | B2 | 7/2021 | |
| JP | 2021163602 | A * | 10/2021 | |
| KR | 20160143613 | A | 12/2016 | |
| KR | 20210059472 | A | 5/2021 | |
| KR | 20210101340 | A | 8/2021 | |
| KR | 20210128179 | A | 10/2021 | |
| WO | WO-2021032599 | A1 * | 2/2021 | G01S 17/931 |

OTHER PUBLICATIONS

JP 2019016491 A (Takei Toshiyuki) Jan. 31, 2019 [retrieved on Sep. 23, 2025]. Retrieved from Foreign Image and Text database, translation by Clarivate Analytics (Year: 2019).*
JP 2021163602 A (Oka Shigeki) Oct. 11, 2021 [retrieved on Sep. 23, 2025]. Retrieved from Foreign Image and Text database, translation by Clarivate Analytics (Year: 2021).*

* cited by examiner

HEATING COVER FOR A LiDAR SENSOR AND A MANUFACTURING METHOD THEREOF

CROSS-REFERENCE TO RELATED APPLICATION

This application claims priority to Korean Patent Application No. 10-2021-0171057, filed on Dec. 2, 2021, which is incorporated herein by reference in its entirety.

BACKGROUND OF THE DISCLOSURE

Field of the Disclosure

The present disclosure relates to a heating cover provided on the front surface of a LIDAR sensor and a manufacturing method thereof.

Description of Related Art

A Light Detection and Ranging (LiDAR) sensor is an essential sensor for realizing autonomous driving as it is used to detect the distance from an object and various physical properties by directing a laser on the object.

The LiDAR sensor is installed in vehicles as an essential sensor along with the advancement of autonomous driving. LiDAR sensors are becoming smaller and cheaper with development in technology and particularly require high resolution (an increase in the number of channels).

Such high resolution is an essential performance of LiDAR and is a key performance to enhance the completeness (safety) of the autonomous driving function. However, despite the development of LiDAR with such high resolution, the performance of LiDAR may deteriorate due to environmental factors such as snow, rain, fog, or the like.

In fact, if ice (frost) forms on the surface of the LiDAR on a snowy day, a decrease in cognitive performance may occur that prevents vehicles and objects from being recognized properly during driving.

The decrease in resolution occurs according to the basic principle of LiDAR using the Time of Flight (TOF) method and light loss by natural materials such as absorption/scattering/reflection of near-infrared rays.

The LiDAR uses the TOF method in recognizing a target, so that signal degradation due to 'contaminants' occurs in a signal transmission/reception path.

In particular, snow causes the sensor transmission/reception efficiency in the TOF method to deteriorate due to absorption/reflection/refraction of wavelengths in the near-infrared region.

In other words, near-infrared rays (905 nm) have hundreds of times greater moisture absorption compared to visible light (450-750 nm), and the refractive index changes according to the salt content in moisture.

According to D (distance)=$\Delta T \times (C/2n)$, as the refractive index n increases, the speed becomes slower and the recognition distance becomes shorter, and surface scattering light loss occurs due to the Rayleigh effect.

In order to solve this problem, the LiDAR sensor is provided with a hot wire on the back side of a cover.

However, the conventional technology of putting the hot wire is not suitable for a high-resolution LiDAR. In particular, the fixed LiDAR (Flash, etc.) has a planar laser form that spreads and emits light, rather than a spotted laser form, in which case an area reflected by the hot line becomes larger. Even with a scanning LiDAR that emits a laser in a spotted form, the loss due to the hot wire increases as the number of spots increases. However, if the interval between the hot lines is widened, the amount of heat generated is insufficient and the heating temperature becomes non-uniform. This will become a big bottleneck for improving the performance of the LiDAR sensor.

In other words, in the case of a low-resolution (small channel) LiDAR in which the hot lines are arranged as illustrated in FIG. 1, a laser is emitted between the hot lines so that the LiDAR has sensing ability. However, there is a disadvantage in that the heating temperature is non-uniform. This is because it is necessary to have at least a certain distance between the hot lines to secure a laser transmission area.

As a result, the non-uniform resistance heat caused by the hot line pattern leads to a decrease in the efficiency due to the local heating, and thus a high-resolution LiDAR cannot be applied.

As a result of the light loss (reflection) test result due to the hot line pattern when a high-resolution (multi-channel) LiDAR is applied, as illustrated in FIG. 2, as the number of lasers increases and the laser light power decreases due to absorption and reflection by the hot lines, signal loss occurs. Therefore, it is necessary to devise a novel material and structure that can replace the metal hot line method.

The matters described in the background art are intended to help understand the background of the present disclosure and may include matters that are not already known to those of ordinary skill in the art to which this technology belongs.

SUMMARY OF THE DISCLOSURE

The inventive concept of the present disclosure has been devised to solve the above problems. An objective of the present disclosure is to provide a heating cover for a Light Detection and Ranging (LiDAR) sensor capable of not causing light loss even by a high-resolution LiDAR, and a manufacturing method thereof.

According to an aspect of the present disclosure, a heating cover for a LiDAR sensor includes a plastic cover layer and a heating film attached to a back surface of the plastic cover layer. In the heating film, an indium tin oxide (ITO) thin film layer is formed on a polyethylene terephthalate (PET) film. Respective line electrodes are arranged along both long sides on the ITO thin film layer.

In an embodiment, the line electrodes in a pair may be arranged in parallel.

In an embodiment, the sheet resistance of the ITO thin film layer may have a range of 50 to 70Ω.

In an embodiment, the transmittance of the ITO thin film layer may be at least 70% at 905±60 nm.

In an embodiment, the line electrode may have a thickness of 15 to 20 μm.

In an embodiment, the ITO thin film layer may be divided in a direction parallel to a short side thereof.

In an embodiment, the ITO thin film layer may be divided into four or more regions.

In an embodiment, the ITO thin film layer may be divided into five regions.

In an embodiment, the heating cover may further include a first low-reflective layer coated on a front surface of the plastic cover layer and may include a second low-reflective layer coated on a back surface of the PET film.

In an embodiment, each of the first low-reflective layer and the second low-reflective layer may be a multilayer film composed of a $ZrO_2$ thin film layer and a $SiO_2$ thin film layer.

According to another aspect of the present disclosure, a method of manufacturing a heating cover for a LiDAR sensor includes forming an indium tin oxide (ITO) thin film layer on a polyethylene terephthalate (PET) film to prepare a heating film and attaching the heating film to a back surface of a plastic cover layer. Respective line electrodes are arranged along both long sides on the ITO thin film layer.

In an embodiment, the line electrodes in a pair may be arranged in parallel.

In an embodiment, the ITO thin film layer may be divided in a direction parallel to a short side thereof.

In an embodiment, the method may further include: forming a first low-reflective layer on a front surface of the plastic cover layer; and forming a second low-reflective layer on a back surface of the PET film.

In the case of using the existing Ag paste-type hot line, there was a problem in that the frost was re-formed in the area other than an area corresponding to the hot line due to the limitation of 'local heating'.

On the other hand, in the heating cover to which the hot line is applied according to the present disclosure, the frost can be maintained without being re-formed over the entire area, due to the 'heating over the entire area' effect.

Accordingly, there is an advantage that the hot line can be applied to various cover shapes such as curved surfaces and flat surfaces.

DESCRIPTION OF SPECIFIC EMBODIMENTS

In order to fully understand objectives, operations, and effects and advantages of the present disclosure, reference should be made to the accompanying drawings illustrating embodiments of the present disclosure and the contents described in the accompanying drawings.

In describing embodiments of the present disclosure, a description about known techniques or a repetitive description that may unnecessarily obscure the gist of the present disclosure have been shortened or omitted.

The present disclosure is directed to a heating cover mounted on a front surface of a housing of a Light Detection and Ranging (LiDAR) sensor that transmits and receives light for autonomous driving. An indium tin oxide (ITO) metal oxide is bonded to a back surface of a plastic cover layer and a line electrode is formed on the ITO thin film layer.

The ITO metal oxide can transmit light in the vicinity of the near-infrared light of 905 nm, which is the actual available wavelength of a LiDAR. For the application to the present disclosure, the heating cover needs to include a material having a transmittance of at least 70% or more in a wavelength band of 905 nm±30. In this regard, instead of ITO, a fluorine-doped tin oxide (FTO) can also be applied to the present disclosure. However, when using the 'deposition' technique with these materials, these materials cannot be used due to the deviation of deposition in planar and curved designs. Therefore, a method is proposed in which such materials are pre-deposited on a film and the material-deposited film is attached to a cover (flat/curved surface.

In addition, for the application to the present disclosure, the deposited material layer needs to at least have a sheet resistance of 70Q or less and, in the present disclosure, includes an ITO film of about 50 to 70Ω.

For this, the ITO film preferably has a thickness of 60 to 80 nm, and a transmittance of 76 to 78%.

At the same time, the transmittance needs to have 70% or more. The reason why the sheet resistance is limited to 70Ω or less is because of the 'heating temperature'. If the sheet resistance exceeds 70Ω, the heating temperature cannot reach 50° C. within 2 minutes. For use in a hot line for a LiDAR, a material needs to reach 50° C. or higher within 3 minutes on the basis of 12V vehicle power application.

If the transmittance is less than 70%, a signal at a distance of 200 meters or more from the LiDAR sensor cannot be detected.

As described above, for the optical performance, the near-infrared transmission performance varies depending on the deposition thickness (sheet resistance) of the ITO (the transmittance of 83% is secured at the sheet resistance of 50Ω). For the heating performance, the heating area and temperature vary depending on the deposition thickness of ITO and the structure of the Ag wire.

Figure 1:
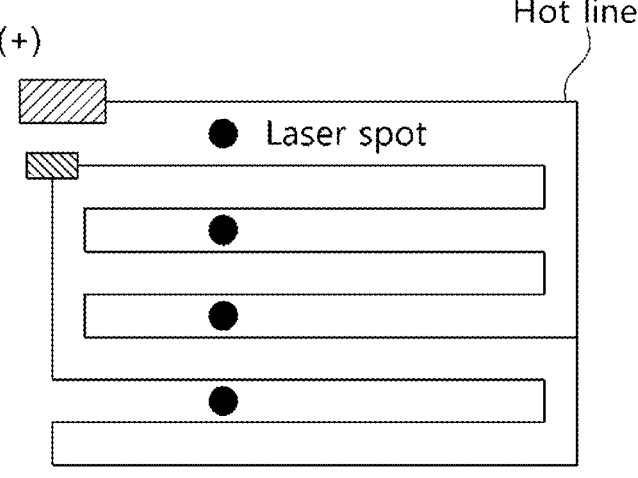
FIGS. 1 and 2 illustrate a hot line of a conventional cover.
Figure 2:
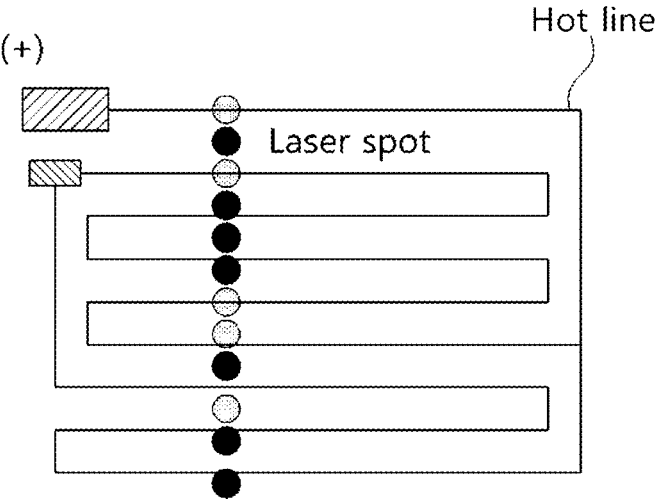
Figure 3:
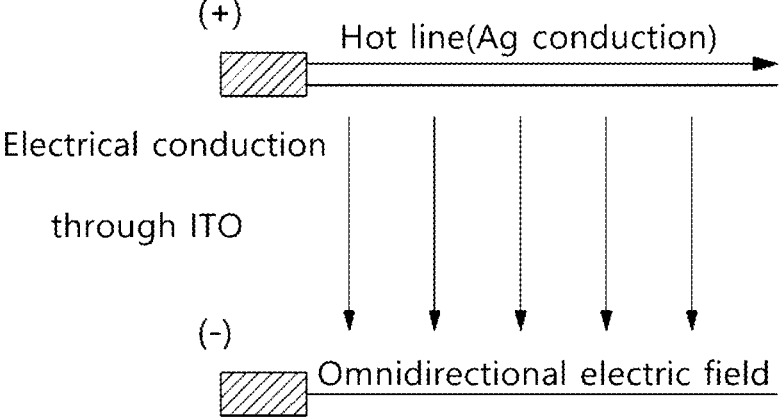
FIG. 3 illustrates a hot line pattern according to the present disclosure.

The present disclosure employs the configuration in which the Ag paste is formed in linear wiring on the ITO film as in FIG. 3 to obtain the surface heating effect, instead of the conventional electrode arrangement, in consideration of the heating area and temperature. It is confirmed that such a configuration can be applied to the present disclosure due to the surface heating effect.

In other words, it was confirmed that the electric field effect induced between the Ag wire electrodes was maximum, and it is desirable that the two wires are arranged in parallel without being connected to each other. Otherwise, local heating due to the local electric field will occur.

Figure 4:
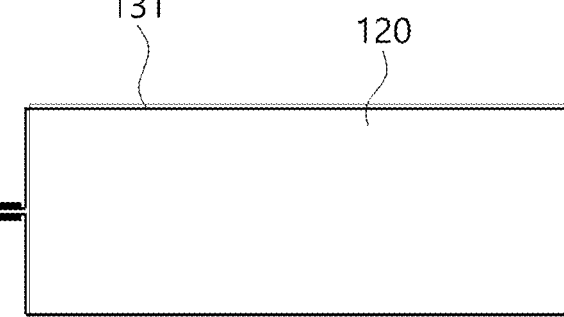
FIGS. 4 and 5 schematically illustrate a heating cover for a Light Detection and Ranging (LiDAR) sensor according to a first embodiment of the present disclosure.
Figure 5:
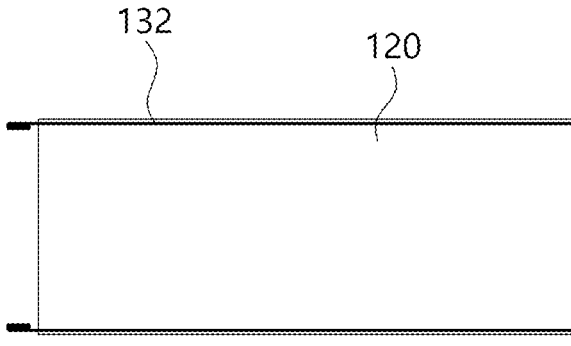
Figure 6:
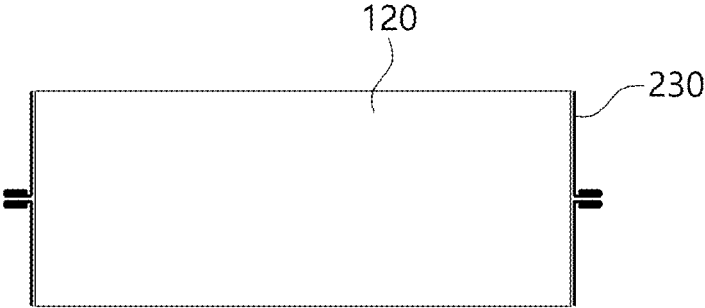
FIG. 6 schematically illustrates a heating cover for a LiDAR sensor according to a first comparative example.

FIGS. 4 and 5 schematically illustrate a heating cover for a LiDAR sensor according to a first embodiment of the present disclosure. FIG. 6 schematically illustrates a heating cover for a LiDAR sensor according to a first comparative example.

Hereinafter, the heating cover for a LiDAR sensor according to the first embodiment is described with reference to FIGS. 4 and 5.

The present disclosure is characterized in that a pair of line electrodes 131 and 132, which are parallel to each other, is arranged on an upper surface of an ITO thin film layer 120 having a rectangular planar shape, as illustrated in the drawings, along both long sides thereof.

A pair of Ag paste electrodes function as (+) and (−) electrodes and, as the conductivity increases, an electric field value applied to the ITO thin film layer 120 surface increases.

The line electrode may have a thickness of 15 to 20 μm, a sheet resistance of 50 mΩ/m², and a line width of 2,000 μm.

FIGS. 4 and 5 illustrate a case where, though the power input terminal structures are different. it was confirmed that there is no difference in the heating feature due to the difference in the power input terminal structures and that the heating temperature decreases as the distance from a power supply increases. In the case of the example of FIG. 4, the heating temperature was 48.8° C., and in the case of the example of FIG. 5, the heating temperature was 48.7° C.

As illustrated in FIG. 6 in which a line electrode 230 of the Ag paste electrode has a vertical structure parallel to a short side thereof, it could be confirmed that the heating temperature showed 31.5° C., showing degraded heating performance due to the low electric field (V/m) in the ITO thin film layer 120 surface.

Figures 7, 8:
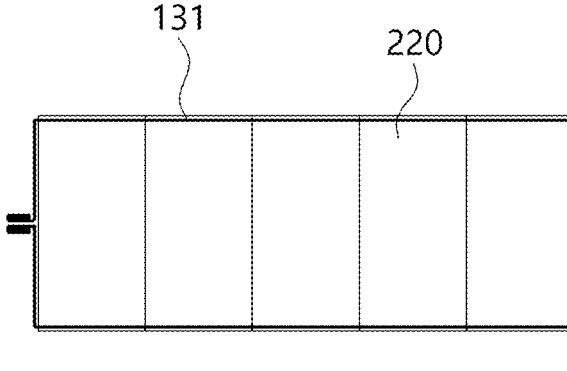
FIGS. 7 and 8 schematically illustrate a heating cover for a LiDAR sensor according to a second embodiment of the present disclosure.

Next, FIGS. 7 and 8 schematically illustrate a heating cover for a LiDAR sensor according to a second embodiment of the present disclosure.

Figures 9, 10:
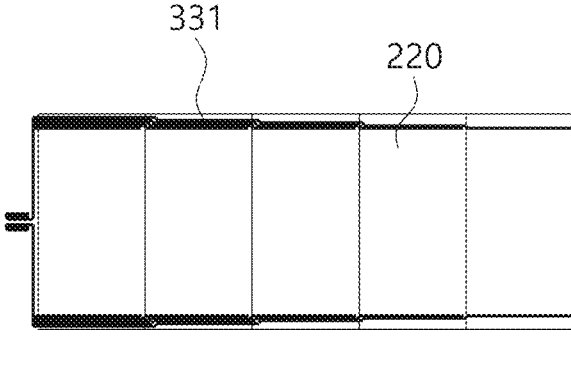
FIG. 9 schematically illustrates a heating cover for a LiDAR sensor according to a second comparative example.
FIGS. 10 and 11 schematically illustrate a heating cover for a LiDAR sensor according to a third embodiment.
Figure 11:
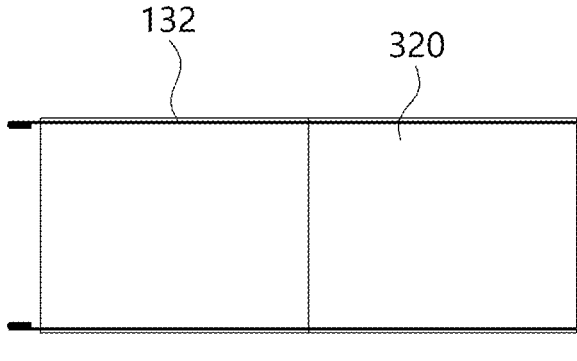

Further, FIGS. 10 and 11 schematically illustrate a heating cover for a LiDAR sensor according to a third embodiment, verifying a change in the electric field distribution according to the division of the ITO deposition surface.

The ITO thin film layer is evenly divided parallel to a short side thereof. As a result of the verification, the division into 4 or more regions showed excellent heating performance while the division into 3 or less regions showed the deteriorated heating performance due to non-uniform heating by a voltage drop relative to the case where the division does not occur. As illustrated in FIGS. 7 and 8, the division of the ITO thin film layer 220 into 5 regions showed the best heating performance.

In the case of division into 4 or more regions, as is farther away from an electrode contact, the deteriorated heating due to a voltage loss is improved and the highest temperature region moves to the center.

In addition, when the deposition thickness was thick, the maximum and average increase occurred in the heating temperature. In one example, the thickness has a sheet resistance of 70Ω or more.

The division into 5 regions in FIG. 7 showed the heating temperature of 49.2° C., and the division into 5 regions in FIG. 8 showed the heating temperature of 49.4° C., thereby exhibiting excellent heating performance.

In addition, division of an ITO thin film layer 320 into 2 regions in FIG. 10 showed the heating temperature of 45.9° C., and the division into 2 regions in FIG. 11 showed the heating temperature of 45.7° C., and thus excellent heating performance was exhibited.

Figure 12:
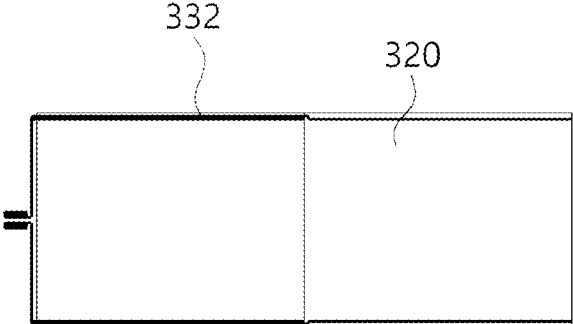
FIG. 12 schematically illustrates a heating cover for a LiDAR sensor according to a third comparative example.

FIG. 9 schematically illustrates a heating cover for a LiDAR sensor according to a second comparative example. FIG. 12 schematically illustrates a heating cover for a LiDAR sensor according to a third comparative example.

The second comparative example is a case in which the ITO thin film layer 220 is divided into 5 regions, line electrodes 331 are separately connected to the divided ITO regions, respectively, and the heating temperature is reduced to 40.0° C. (local heating). In addition, the third comparative example is a case in which the ITO thin film layer 320 is divided into two regions, line electrodes 332 are separately connected to the divided ITO regions, respectively, and the heating temperature is reduced to 41.5° C.

In other words, it is desirable that a line electrode is connected without division.

Figure 13:
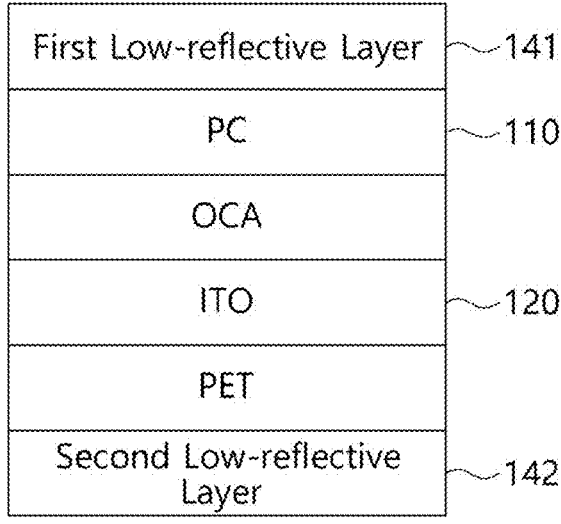
FIG. 13 schematically illustrates a heating cover for a LiDAR sensor according to a third embodiment of the present disclosure.
Figure 14:
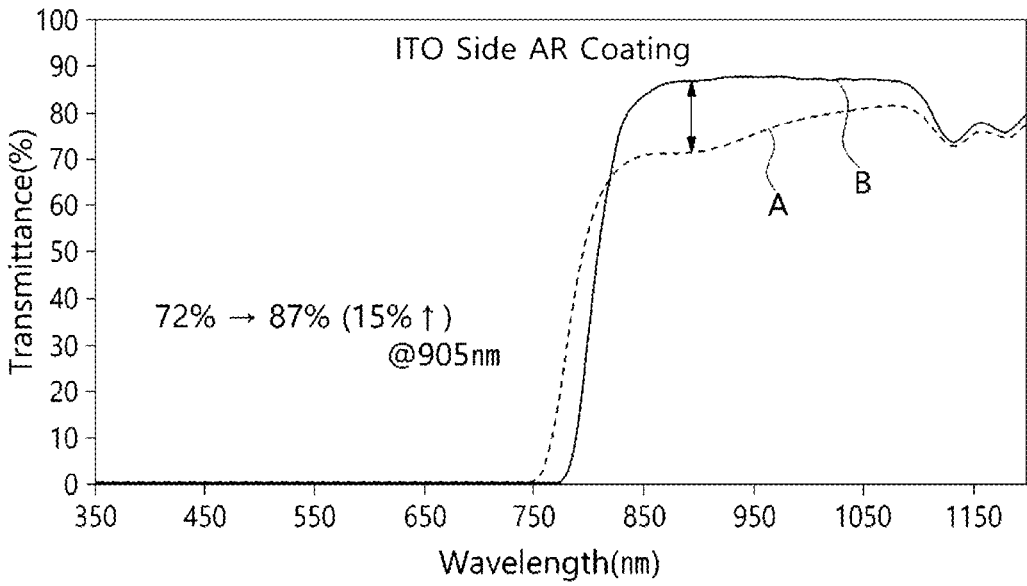
FIGS. 14 and 15 illustrate the transmittance when a heating cover for a LiDAR sensor according to the third embodiment of the present disclosure is applied.
Figure 15:
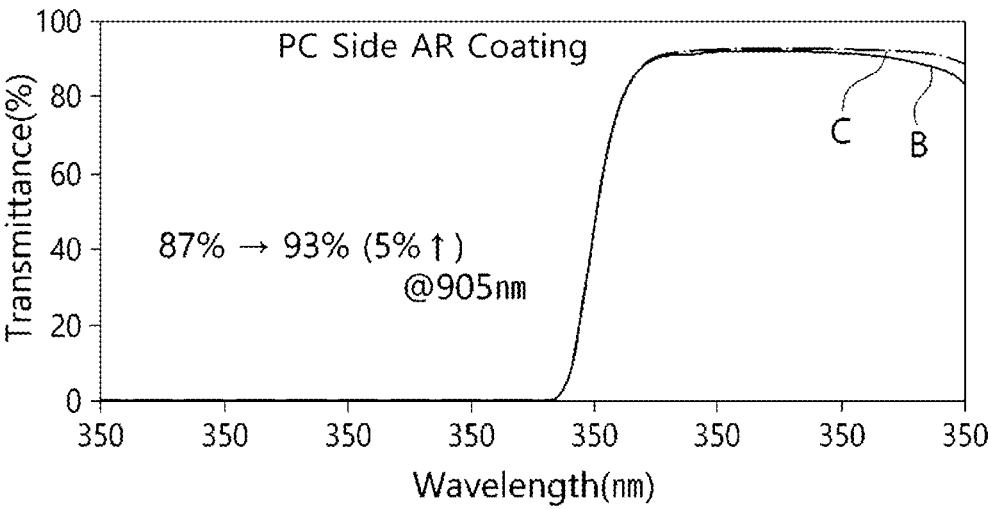

Next, FIG. 13 schematically illustrates a heating cover for a LiDAR sensor according to a third embodiment of the present disclosure. FIGS. 14 and 15 illustrate the transmittance when the heating cover for a LiDAR sensor according to the third embodiment is applied.

When a heating film composed of an ITO thin film layer 120 and a line electrode 131 is attached to a plastic cover layer 110 according to the present disclosure, a decrease in near-infrared transmittance may occur due to differences in refractive index, interfacial reflection, etc. for each material.

Accordingly, the third embodiment of the present disclosure allows the transmittance to be further increased by applying a low-reflective coating to the heating cover.

As illustrated in FIG. 13, a first low-reflective layer 141 is coated on a front surface of the plastic cover layer PC 110 and a second low-reflective layer 142 is formed on a transparent electrode film. Thus, the greatest rising effect in transmittance can be expected as confirmed in FIGS. 14 and 15.

In other words, the first low-reflective layer 141 is coated on the front surface of the plastic cover layer PC 110, an ITO thin film layer 120 with a line electrode 131 is attached to a back surface of the plastic cover layer 110 by an adhesive (Optically Clear Adhesive, OCA), and the second low-reflective layer 142 is coated on the back surface of a heating film to which a polyethylene terephthalate (PET) film is attached to the back surface of the ITO thin film layer 120.

To summarize the manufacturing method of the heating cover for a LiDAR sensor according to the present disclosure as described above, first, an ITO with a line electrode is laminated on a PET film to form an ITO thin film layer, and such a heating film is applied to a back surface of a plastic cover layer PC.

After the injection-molded product plasma treatment and heat treatment, the first low-reflective layer 141 and the second low-reflective layer 142 are coated thereon.

The low-reflective layer may be, for example, a multilayer film of $ZrO_2$ and $SiO_2$.

Figure 16:
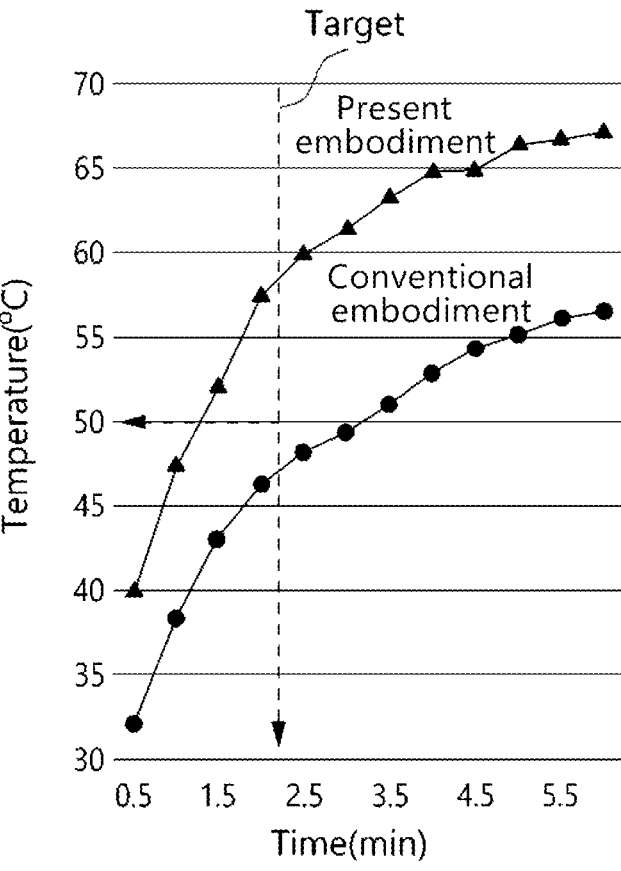
FIG. 16 illustrates a comparison of heating performances according to the second embodiment of the present disclosure.

As described above, as compared to the existing heating wire made of only Ag paste, according to the heating cover of the present disclosure, the heating performance was greatly improved as illustrated in FIG. 16 (46° C.→57° C. within 2 minutes), and the temperature deviation was also greatly reduced (16° C.→3° C.).

Figure 17:
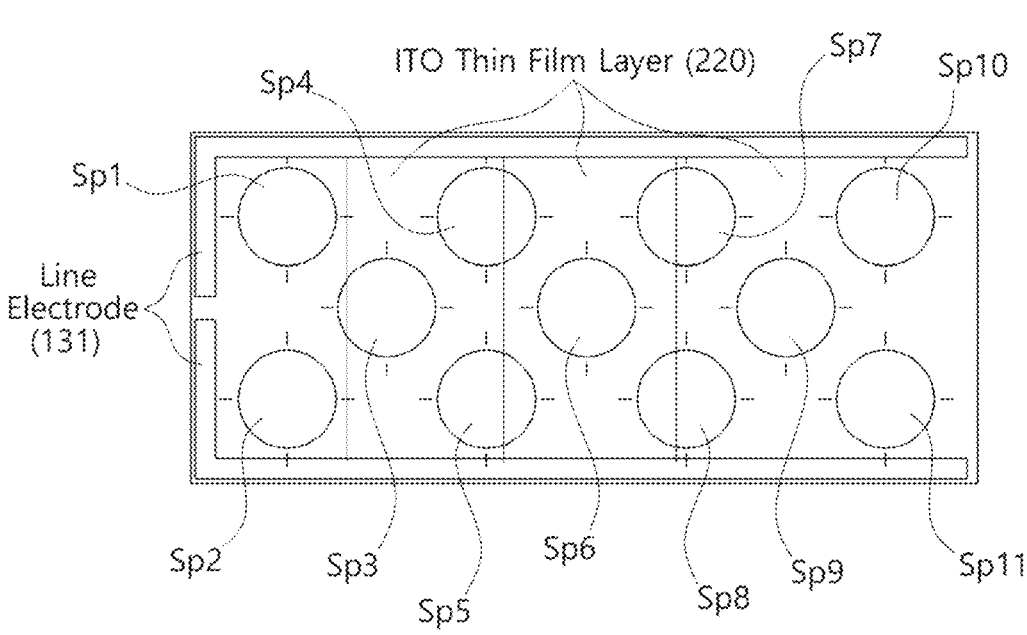
FIG. 17 illustrates an infrared photographed image according to the second embodiment of the present disclosure.
Figure 18:
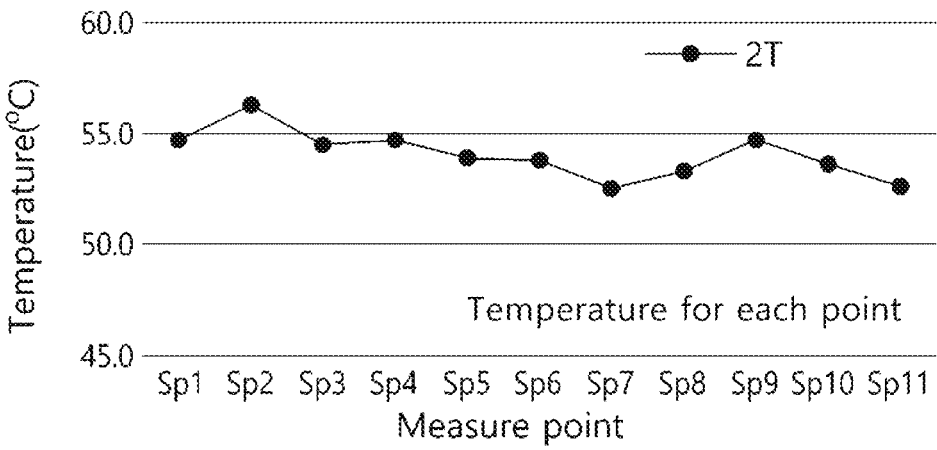
FIG. 18 illustrates the temperature for each point in FIG. 17.

In addition, as can be seen in FIGS. 17 and 18, the area through which near-infrared light can be transmitted is greatly increased. Thus, there is a great advantage in that the heating cover can be applied to a high-resolution spot-emitting LiDAR and a surface-emitting solid state LiDAR such as a flash type LiDAR. In FIGS. 17 and 18, the temperatures are measured at a plurality of measure points Sp1-Sp11. In FIG. 18, "2T" means that the thickness of each measure point is 2 mm.

While the inventive concept of the present disclosure as described above has been illustrated with reference to the drawings, the present disclosure is not limited to the described embodiments. It should be apparent to those of ordinary skill in the art that various modifications and variations can be made without departing from the spirit and scope of the present disclosure. Therefore, such modifications or variations should be considered to belong to the claims of the present disclosure, and the scope of the present disclosure should be construed based on the appended claims.

What is claimed is:

1. A heating cover for a Light Detection and Ranging (LiDAR) sensor, the heating cover comprising:

a plastic cover layer; and a heating film attached to a back surface of the plastic cover layer, wherein the heating film is a polyethylene terephthalate (PET) film on which an indium tin oxide (ITO) thin film layer is formed, and wherein respective line electrodes are arranged along both long sides on the ITO thin film layer, wherein the ITO thin film layer is divided in a direction parallel to a short side thereof.

2. The heating cover of claim 1, wherein the line electrodes in a pair are arranged in parallel.

3. The heating cover of claim 2, wherein a sheet resistance of the ITO thin film layer has a range of 50 to 70$\Omega$.

4. The heating cover of claim 3, wherein a transmittance of the ITO thin film layer is at least 70% at 905±60 nm.

5. The heating cover of claim 3, wherein the line electrodes have a thickness of 15 to 20 µm.

6. The heating cover of claim 2, further comprising a first low-reflective layer coated on a front surface of the plastic cover layer.

7. The heating cover of claim 6, further comprising a second low-reflective layer coated on a back surface of the PET film.

8. The heating cover of claim 7, wherein each of the first low-reflective layer and the second low-reflective layer is a multilayer film composed of a $ZrO_2$ thin film layer and a $SiO_2$ thin film layer.

9. The heating cover of claim 1, wherein the ITO thin film layer is divided into four or more regions.

10. The heating cover of claim 9, wherein the ITO thin film layer is divided into five regions.

11. A method of manufacturing a heating cover for a Light Detection and Ranging (LiDAR) sensor, the method comprising:

forming an indium tin oxide (ITO) thin film layer on a polyethylene terephthalate (PET) film to prepare a heating film; and attaching the heating film to a back surface of a plastic cover layer, wherein respective line electrodes are arranged along both long sides on the ITO thin film layer, wherein the ITO thin film layer is divided in a direction parallel to a short side thereof.

12. The method of claim 11, wherein the line electrodes in a pair are arranged in parallel.

13. The method of claim 11, further comprising:

forming a first low-reflective layer on a front surface of the plastic cover layer; and forming a second low-reflective layer on a back surface of the PET film.

* * * * *